(12) United States Patent
Honda

(10) Patent No.: US 8,804,174 B2
(45) Date of Patent: Aug. 12, 2014

(54) INFORMATION PROCESSING APPARATUS FOR MANAGING A NON-PRINT JOB IN A PRINT QUEUE, RECORDING MEDIUM, AND CONTROL METHOD

(75) Inventor: Hideki Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/468,870

(22) Filed: May 10, 2012

(65) Prior Publication Data

US 2012/0293834 A1 Nov. 22, 2012

(30) Foreign Application Priority Data

May 18, 2011 (JP) ................. 2011-111584

(51) Int. Cl.
*G06F 3/12* (2006.01)
*G06K 15/00* (2006.01)

(52) U.S. Cl.
USPC ........................ 358/1.15; 358/1.18

(58) Field of Classification Search
CPC ..... G06F 3/1204; G06F 3/1285; G06F 3/126; G06F 3/1243; G06F 3/1229; G06F 11/0733; G06F 11/0736; G06F 11/3013; H04N 1/00132; H04N 1/00188; H04N 21/4343; H04N 21/435

USPC .............. 358/1.1, 1.9, 1.13, 1.14, 1.15, 1.16, 358/1.18; 709/201, 203, 214, 402; 345/629

See application file for complete search history.

(56) References Cited

U.S. PATENT DOCUMENTS

| | | | |
|---|---|---|---|
| 7,945,712 B2 * | 5/2011 | Kawasaki | 710/15 |
| 8,223,361 B2 * | 7/2012 | Ferlitsch | 358/1.15 |
| 8,526,041 B2 * | 9/2013 | Suzuki | 358/1.15 |
| 2008/0300996 A1 * | 12/2008 | Fei et al. | 705/26 |
| 2008/0316530 A1 * | 12/2008 | Kurihara | 358/1.15 |

FOREIGN PATENT DOCUMENTS

JP 2009-003778 A 1/2009

\* cited by examiner

*Primary Examiner* — Gabriel Garcia

(74) *Attorney, Agent, or Firm* — Canon U.S.A., Inc. IP Division

(57) ABSTRACT

When a job is a non-print job, an information processing apparatus writes dummy data to a printing apparatus during job-end processing. Alternatively, when print data is not written to the printing apparatus during the job-end processing, the information processing apparatus directly instructs a print queue to hide the management information of a non-print job.

12 Claims, 21 Drawing Sheets

FIG. 6

| | |
|---|---|
| Definition: | JobType |
| Node Type: | Value |
| Description: | TYPE OF JOB |
| Full Schema Path: | \Printer.JobType:Value |
| Data type: | BIDI_STRING |

FIG. 7

```
Allowed Value:
            Normal
            Form
```

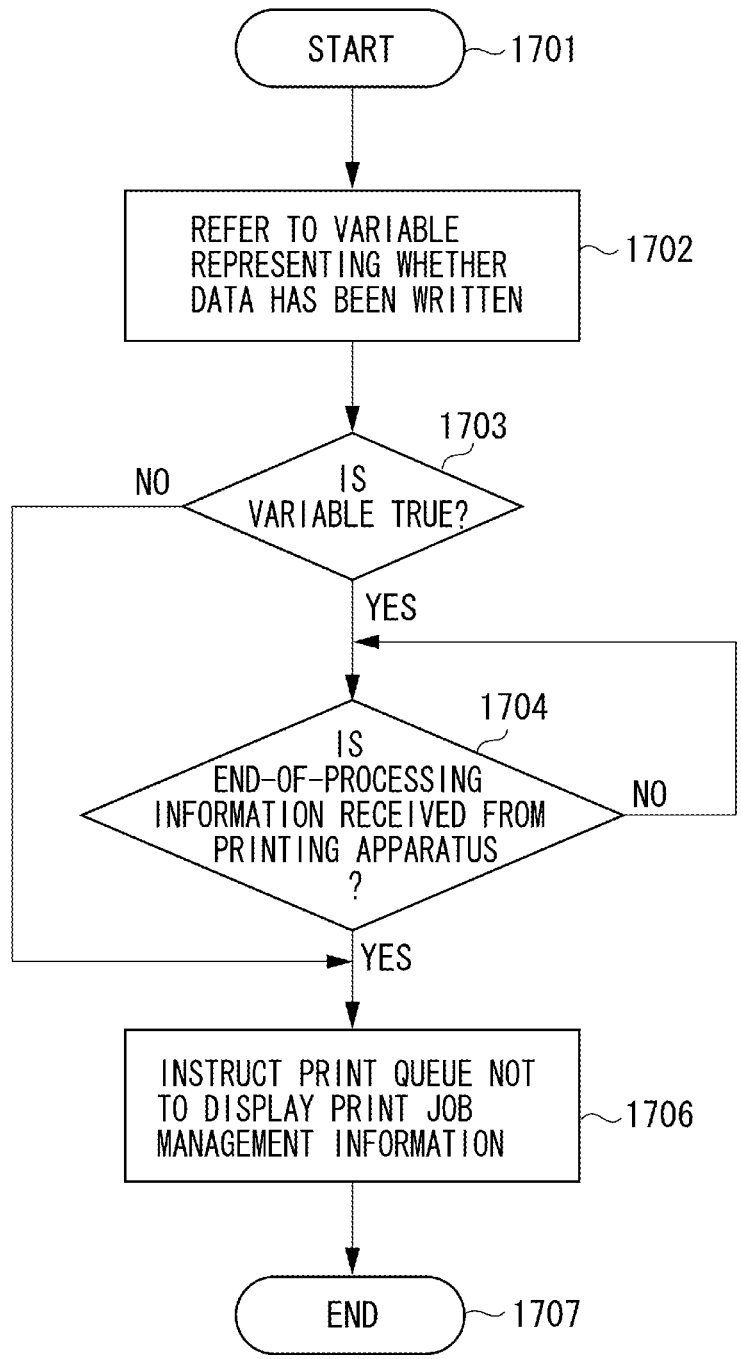

FIG. 18C

| Print Queue History | | | | | | |
|---|---|---|---|---|---|---|
| PRINTER(P) DOCUMENT(D) VIEW(V) | | | | | | |
| DOCUMENT NAME | STATUS | OWNER | PAGES | SIZE | RECEIVED TIME | PORT |
| Ota_Shim.txt-NOTEPAD | PRINT COMPLETED | | 1/1 | 1.50KB | 14:53:16 | |

0 DOCUMENT(S) HELD IN QUEUE

INFORMATION PROCESSING APPARATUS FOR MANAGING A NON-PRINT JOB IN A PRINT QUEUE, RECORDING MEDIUM, AND CONTROL METHOD

BACKGROUND OF THE INVENTION

1. Field of the Invention

The present invention relates to a technique for spooling a non-print job.

2. Description of the Related Art

As an example of a method for allowing an information processing apparatus connected to a printing apparatus to perform printing using the printing apparatus, the following method is described.

In this method, when an information processing apparatus instructs a printing apparatus to perform printing, job management information is displayed in a print queue of the information processing apparatus, and the information processing apparatus transmits a job to the printing apparatus. Then, after completing the processing of the job, the printing apparatus transmits end-of-processing information to the information processing apparatus so that the display of the job management information in the print queue is changed to indicate a completed state.

Japanese Patent Application Laid-Open No. 2009-3778 discusses a technique in which when a print job is transmitted to a printing apparatus, the state of the printing apparatus is acquired, and completion of printing of the print job is recognized, the information of the print job is deleted from a print queue.

Moreover, a technique referred to as overlay printing is widely known in the printer industry. Overlay printing is a technique for printing template data and data to be combined in an overlaid manner. In general, the template data is stored either the information processing apparatus or the printing apparatus.

When overlay printing is performed with the template data stored in an information processing apparatus, the spooled template data is stored in the information processing apparatus as a form file. When a printing apparatus is instructed to print the data to be combined, the printing apparatus prints the data to be combined by overlaying with the stored form file.

In the present specification, a job such as a form file of which the print data is not transmitted to the printing apparatus will be referred to as a non-print job. Print data means data which is printed by the printing apparatus when the data is transmitted to the printing apparatus with or without converting the data.

When the information processing apparatus spools a non-print job, the management information of the spooled non-print job is displayed in a print queue. However, since the print data of the non-print job does not need to be transmitted to the printing apparatus, the non-print job including the print data is not transmitted to the printing apparatus. Thus, the printing apparatus does not receive the non-print job from the information processing apparatus, and does not transmit end-of-processing information for the non-print job to the information processing apparatus.

As a result, the information processing apparatus cannot receive the end-of-processing information for the non-print job, and the management information of the non-print job remains in a non-completed state in the print queue. Therefore, there are issues in that the non-print job is processed again, and a user needs to manually change the management information of the non-print job in the print queue to a completed state.

SUMMARY OF THE INVENTION

According to the present invention, even when a job is a non-print job of which print data is not transmitted to a printing apparatus, it is possible to solve an issue caused by the fact that management information of the non-print job displayed in a print queue remains in a non-completed state.

According to an aspect of the present invention, there is provided an information processing apparatus in which management information for managing a job is displayed in a print queue of the information processing apparatus, and end-of-processing information that changes the display of the management information of the job in the print queue from a non-completed state to a completed state is received from a printing apparatus after the job is transmitted through a communication path to the printing apparatus, the information processing apparatus includes a determination unit configured to determine whether a job corresponding to the management information in the print queue is a non-print job of which print data of the job to be printed by the printing apparatus is not transmitted to the printing apparatus, and a transmission unit configured, if the determination unit determines that the job is the non-print job, to transmit dummy data which corresponds to the non-print job and which is not printed by the printing apparatus to the printing apparatus, wherein a language monitor executes the determination unit, and wherein the transmission unit receives end-of-processing information of the dummy data after transmitting the dummy data to the printing apparatus, so that the management information of the non-print job in the print queue is changed from a non-completed state to a completed state.

According to another aspect of the present invention, there is provided an information processing apparatus in which management information for managing a job is displayed in a print queue of the information processing apparatus, and end-of-processing information that changes the display of the management information of the job in the print queue from a non-completed state to a completed state is received from a printing apparatus after the job is transmitted through a communication path to the printing apparatus, the information processing apparatus includes a determination unit configured to determine whether a job corresponding to management information displayed in the print queue is a non-print job of which print data of the job to be printed by the printing apparatus is not transmitted to the printing apparatus, and a completion unit configured to change the display of management information of a non-print job in the print queue to a completed state without waiting for end-of-processing information from the printing apparatus if the determination unit determines that the job is the non-print job.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example schema used for notifying the job type of a job.

FIG. 7 illustrates an example schema used for notifying the job type of a job.

FIG. 17 is a flowchart illustrating example print-end processing of the spooler.

FIGS. 18A to 18D illustrate an example display state of a print queue.

DESCRIPTION OF THE EMBODIMENTS

Various exemplary embodiments, features, and aspects of the invention will be described in detail below with reference to the drawings.

A first exemplary embodiment to which the present invention can be applied will be described with reference to FIGS. 1 to 11.

<System Configuration>

The configuration of a printing system in which an information processing apparatus and a printing apparatus are connected with each other via a network as a communication path will be described with reference to FIG. 1.

The communication path may be a wired or wireless network and may be a universal serial bus (USB) or infrared communication realized by an interface unit 108 described below.

Figure 1:
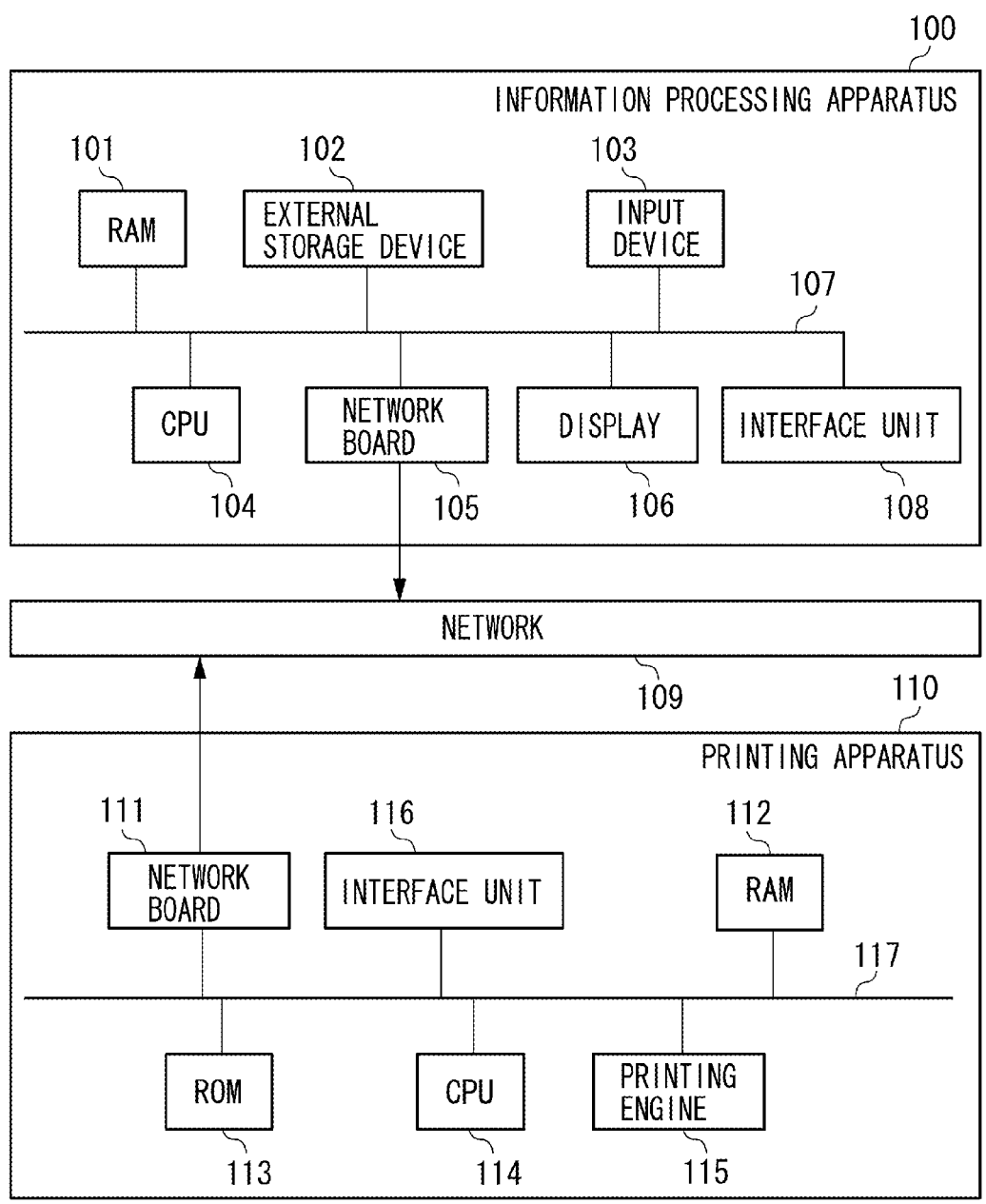
FIG. 1 is a block diagram illustrating an example configuration of a printing system including an information processing apparatus and a printing apparatus which are connected with each other via a network.

In FIG. 1, an information processing apparatus 100 is configured as a general personal computer (PC). The information processing apparatus 100 includes a random access memory (RAM) 101, an external storage device 102, an input device 103 such as a mouse and a keyboard, a central processing unit (CPU) 104, a network board 105, a display 106, an interface unit 108, and a bus 107 connecting these constituent components to each other.

The RAM 101 is used as a work memory of various programs stored in the external storage device 102. In the external storage device 102, application program groups, an operating system (OS), a printer driver, and other various data pieces are stored. The input device 103 is used for inputting data or operation instructions. The display 106 is used for displaying data of a printing apparatus or an information processing apparatus connected thereto and notifying a user of the state thereof. The network board 105 performs communication via the network and is connected to the network 109. As described above, the information processing apparatus 100 can be connected to the printing apparatus 110 with use of the interface unit 108.

The CPU 104 opens the window of a program stored in the external storage device 102 in response to a cursor input from a mouse on a graphical user interface (GUI) displayed on the display 106 or a key input from a keyboard and executes various data processing. In this way, when a user executes printing, the user can opens a print setting window to perform setting of the printing apparatus 110 and setting of a print processing method with respect to a printer driver including selection of a print mode.

Figure 2:
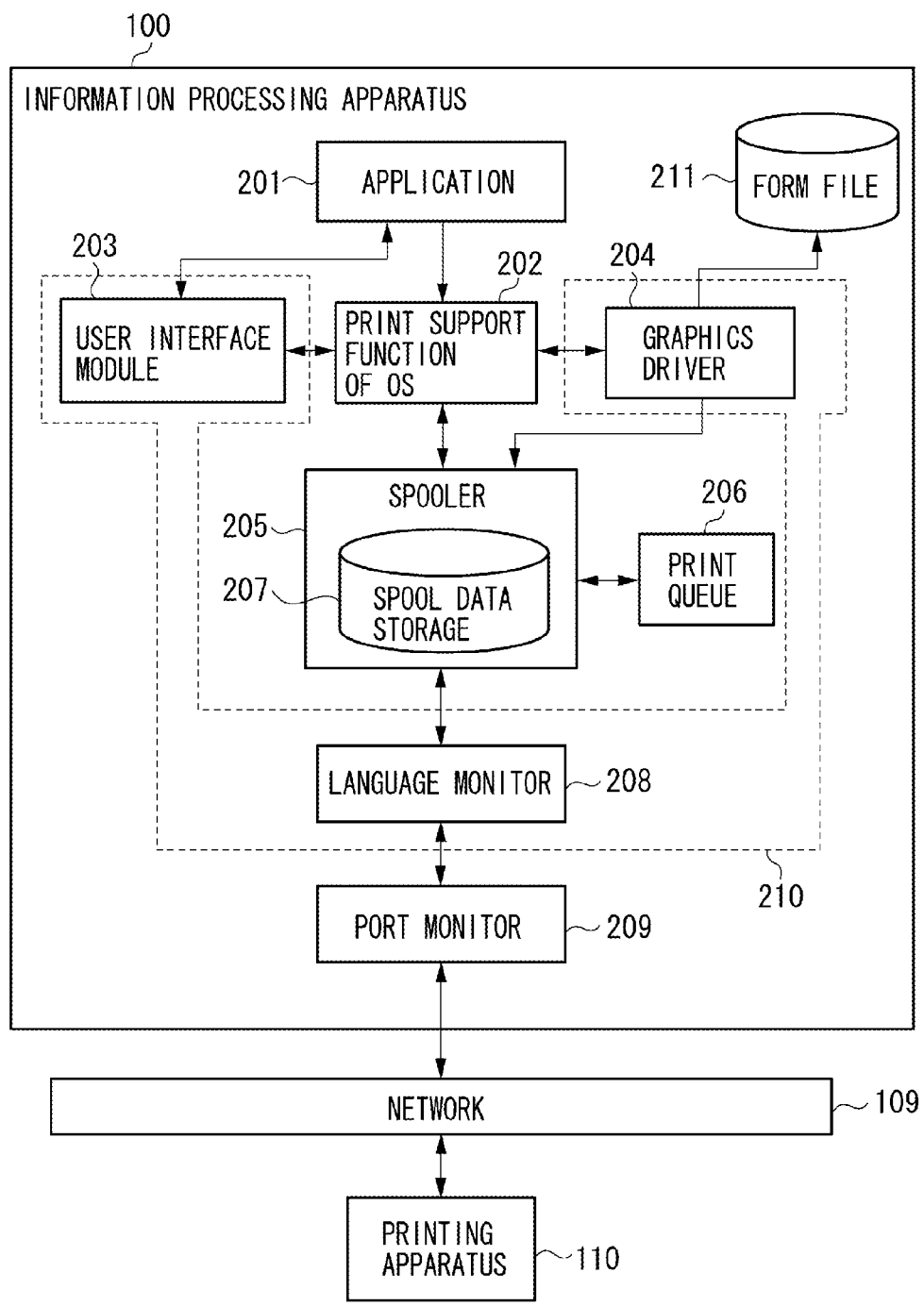
FIG. 2 is a functional component diagram illustrating the configuration of the printing system.

When the CPU 104 executes processing based on the program stored in the external storage device 102, the processes of the software configuration of the information processing apparatus 100 as illustrated in FIG. 2 and the steps in the flowcharts to be described below are realized.

The printing apparatus 110 includes a network board 111, a RAM 112, a read-only memory (ROM) 113, a CPU 114, a printing engine 115, and an interface unit 116. The printing apparatus 110 also includes a bus 117 connecting these constituent components to each other.

The network board 111 is connected to the network 109. A control program and the like are stored in the ROM 113. The CPU 114 controls the printing apparatus 110 according to the control program stored in the ROM 113. The RAM 112 is used as a work memory of the CPU 114 and is also used as a reception buffer for temporarily storing received data. The printing engine 115 prints data stored in the RAM 112.

<Functional Components>

FIG. 2 is a block diagram illustrating a printing system applicable to the information processing apparatus 100 illustrated in FIG. 1. In the drawing, a user interface module 203, a graphics driver 204, and a language monitor 208 each are modules that constitute a printer driver 210.

These modules are called from an operating system (OS) or other programs, whereby the modules are loaded from the external storage device 102 to the RAM 112 to be executed.

An application 201 acquires print setting information from the user interface module 203 with use of a print support function 202 of the OS and creates the print data of a job.

In the present specification, print data is data which is printed by the printing apparatus 110 when the data is transmitted to the printing apparatus 110 with or without converting the data.

The data created by the application 201 is transferred to a spooler 205 with use of the print support function 202 of the OS. The spooler 205 stores the received data in a spool data storage 207.

When the data is stored in the spool data storage 207, a print queue 206 displays that a job including the data is spooled. More specifically, management information of the job is displayed in the print queue 206, and the state where the job is being spooled is displayed as the state of the management information. A detailed method for displaying the print queue will be described below.

<Processing Flow of Normal Print Job and form Creation Job After Spooling>

Processes to be described below are different according to whether the type of job is "normal print job" or "form creation job".

The "normal print job" is a job which is transmitted to the printing apparatus 110, whereby the printing apparatus is instructed to perform printing based on the print data of the normal print job.

When it is the time to perform processing of a job, the data stored in the spool data storage 207 is transmitted to the print support function 202 of the OS and is converted into data of a command format that can be interpreted by the printing apparatus 110 with the help of the graphics driver 204. The graphics driver 204 transfers the converted data to the spooler 205 and instruct the spooler 205 to transmit the converted data so that the printing apparatus 110 performs printing. The spooler 205 transfers the received data to the language monitor 208. The language monitor 208 outputs the converted data to the port monitor 209. The port monitor 209 transmits the received data to the printing apparatus 110 as a job via the network 109.

The "form creation job" is a job for creating a form file 211, which is not transmitted to the printing apparatus 110, and moreover, the printing apparatus 110 is not instructed to perform printing.

The procedure for creating the form file 211 by a user will be described.

The user instructs the application 201 to perform print settings, and the application 201 calls the user interface module 203. The user changes a job type from the normal print job to the form creation job using the user interface module 203 as part of the setting of a print output method. After changing the job type, the setting of the print output method including the job type is stored in the RAM 101 as a variable.

Then, when the user issues a print instruction from the application 201, print data is spooled by the spooler 205. The spooler 205 transfers the print data to the graphics driver 204. The graphics driver 204 calls the variable in the RAM 101, in which the setting of the print output method is stored, and operates by understanding that the job type is the form creation job. In this way, the spooled print data is stored by the graphics driver 204 as the form file 211 so that the spooled print data is used as the form file 211 when performing overlay printing. Thus, the print data is not transmitted from the graphics driver 204 to the spooler 205 as the print instruction issued to the printing apparatus.

The created form file 211 is a template of overlay printing. A previous template is combined with a decorating job to be output later by an application and transmitted to the printing apparatus as a print job. Then, the printing apparatus performs printing of a combined material.

In the present specification, a form creation job is described as an example of a non-print job of which the data is stored in the spool data storage 207 and the data is not transmitted to the printing apparatus. Besides this, the non-print job of which the data is stored in the spool data storage 207 and is not transmitted to the printing apparatus may be generated when a preview, a stamp, or a copy-forgery-inhibited pattern is designated. In the case of a preview, the print data thereof is spooled for preview and the spooled print data is deleted after preview. The stamp and the copy-forgery-inhibited pattern, or the data before these are combined are stored in the information processing apparatus as a file similarly to the form creation job and are not transmitted to the printing apparatus. Thus, the present invention can be applied to an information processing apparatus that handles the stamp and the copy-forgery-inhibited pattern.

In the following description, the normal print job and the form creation job will be distinguished from each other when the two jobs need to be definitely distinguished from each other, and they may be collectively referred to as jobs when it is not necessary to distinguish them from each other.

In the present exemplary embodiment, an example in which printing is performed using Web Services on Devices (hereinafter, referred to as WSD) employed in the Windows Vista (registered trademark) as a printing method will be described. However, the printing method is not limited to this, and the present invention can be applied to other printing methods.

Similarly, although a port monitor for WSD printing is considered as the port monitor 209, the port monitor 209 is not limited to this, and the present invention can be applied to various port monitors.

<Processing Flow of Normal Print Job>

Figure 3:
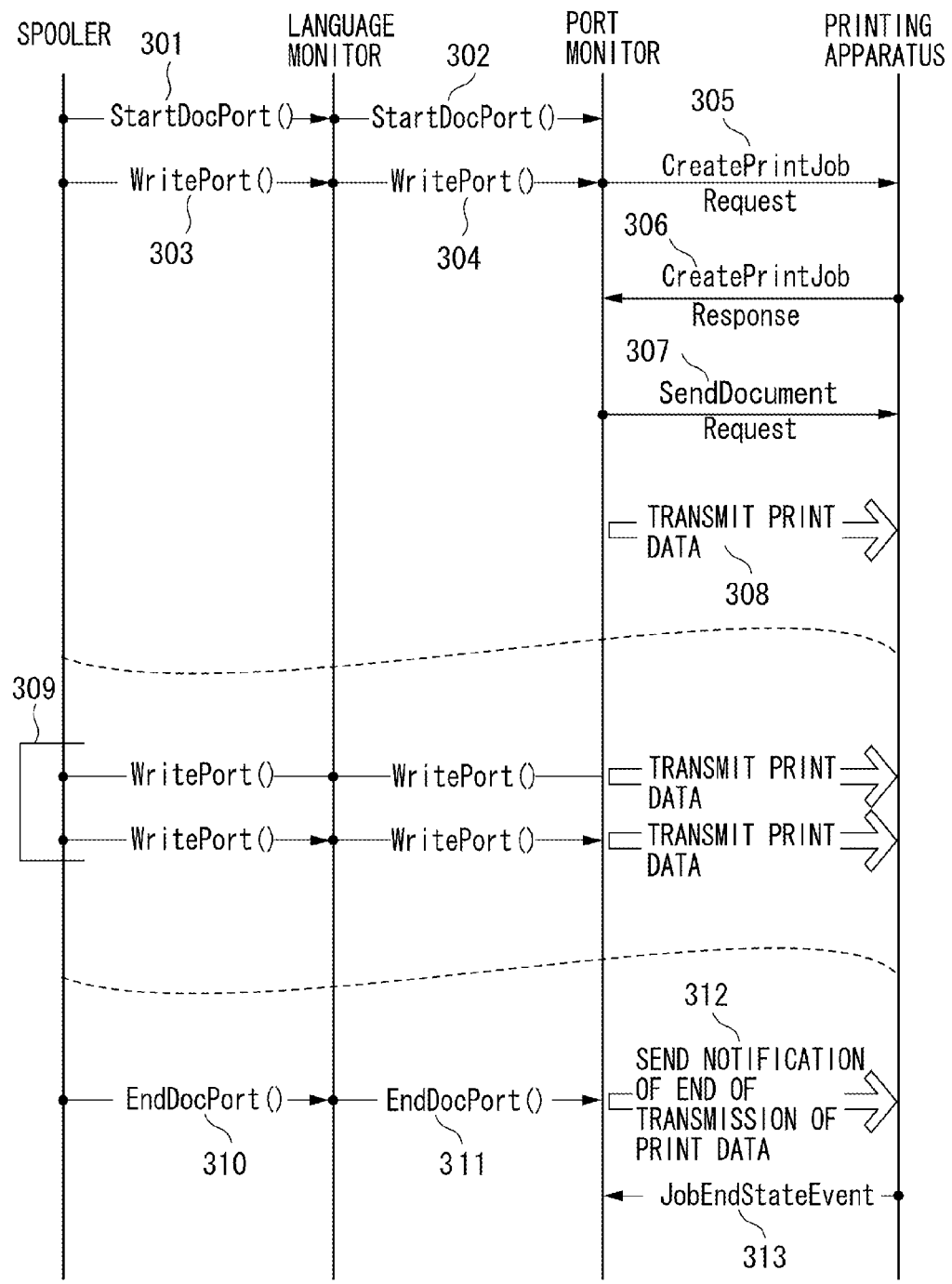
FIG. 3 illustrates an example flow of print processing of a normal print job.

FIG. 3 illustrates the flow of processing of a normal print job in printing using WSD.

It is assumed that before processing in step 301 in FIG. 3 starts, management information of a job that is subjected to print processing is already displayed in the print queue 206.

In step 301, the spooler 205 calls StartDocPort( ), which is a function of the language monitor 208, and instructs the language monitor 208 to start print processing. In step 302, the language monitor 208 calls StartDocPort( ), which is a function of the port monitor 209.

In step 303, the spooler 205 calls WritePort( ), which is a function of the language monitor 208, and starts transmission of the print data of a job. In step 304, the language monitor 208 calls WritePort( ), which is a function of the port monitor 209. In step 305, the port monitor 209 transmits CreatePrintJob Request to the printing apparatus 110 and sends a notification of start of printing. In step 306, the printing apparatus 110 transmits CreatePrintJob Response to the port monitor 209.

In step 307, the port monitor 209 transmits SendDocument Request to the printing apparatus 110. In step 308, the port monitor 209 transmits the first print data to the printing apparatus 110. After step 308, the port monitor 209 returns the WritePort( ) called in step 304 to the language monitor 208.

In step 309, the spooler 205 continuously calls WritePort( ), which is a function of the language monitor 208, to transmit print data to the printing apparatus 110, and the language monitor 208 calls WritePort( ), which is a function of the port monitor 209. The port monitor 209 transmits the print data to the printing apparatus 110 by the processing of WritePort( ). The spooler 205, the language monitor 208, and the port monitor 209 repeat these processes until all of the print data pieces are transmitted.

When all of the print data pieces have been transmitted to the language monitor 208, in step 310, the spooler 205 calls EndDocPort( ), which is a function of the language monitor 208. Subsequently, in step 311, the language monitor 208 calls EndDocPort( ), which is a function of the port monitor 209. In step 312, the port monitor 209 transmits end-of-transmission information indicating end of transmission of the print data in steps 308 and 309 to the printing apparatus 110.

The printing apparatus 110 performs printing based on the print data of the job and, in step 313, transmits JobEndStateEvent, which is the end-of-processing information, to the port monitor 209. In this way, the printing apparatus 110 informs the information processing apparatus 100 of completion of processing of the job.

The flow in which the management information of a normal print job is hidden from the print queue 206 will be described.

In order for the printing apparatus 110 to process a normal print job, the information processing apparatus 100 transmits CreatePrintJob Request to the printing apparatus 110 and then receives, from the printing apparatus 110, JobEndStateEvent corresponding to the CreatePrintJob Response received from the printing apparatus 110. When the job is properly processed by the printing apparatus, the JobEndStateEvent, which is the end-of-processing information, means to cause the information processing apparatus to change the display of the management information of a normal print job in the print queue of to a completed state.

Thus, when the above-described JobEndStateEvent is received from the printing apparatus 110, the management information of the normal print job is hidden from the print queue 206. That is, the display of the management information is changed to a completed state.

<Print Queue Display Method>

A method for displaying a print queue will be described with reference to FIGS. 18A to 18D.

Figure 18A:

FIG. 18A illustrates an example of a state where a print queue displays the management information of a job being spooled. A job displayed in such a manner is said to be in a non-completed state. As described above, a state where the management information of a job is hidden from the print queue 206 is illustrated in FIG. 18D. A job displayed in such a manner is said to be in a completed state.

In general, three methods of "Change", "Hidden", and "Delete" can be considered as a method for managing individual jobs in a list like management (display) of a job in a print queue.

Figure 18B:
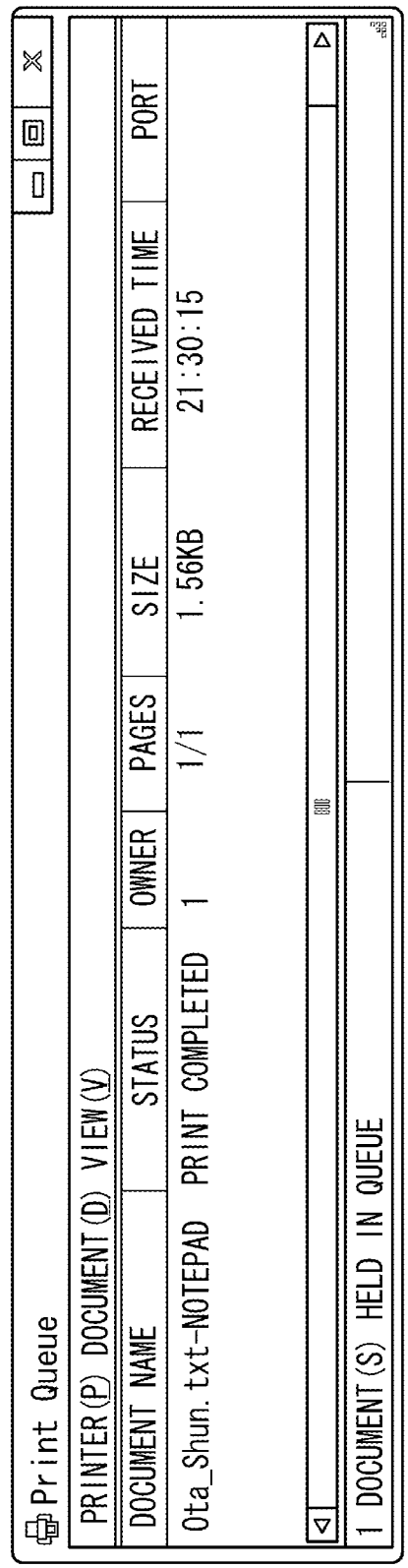
Figure 18D:
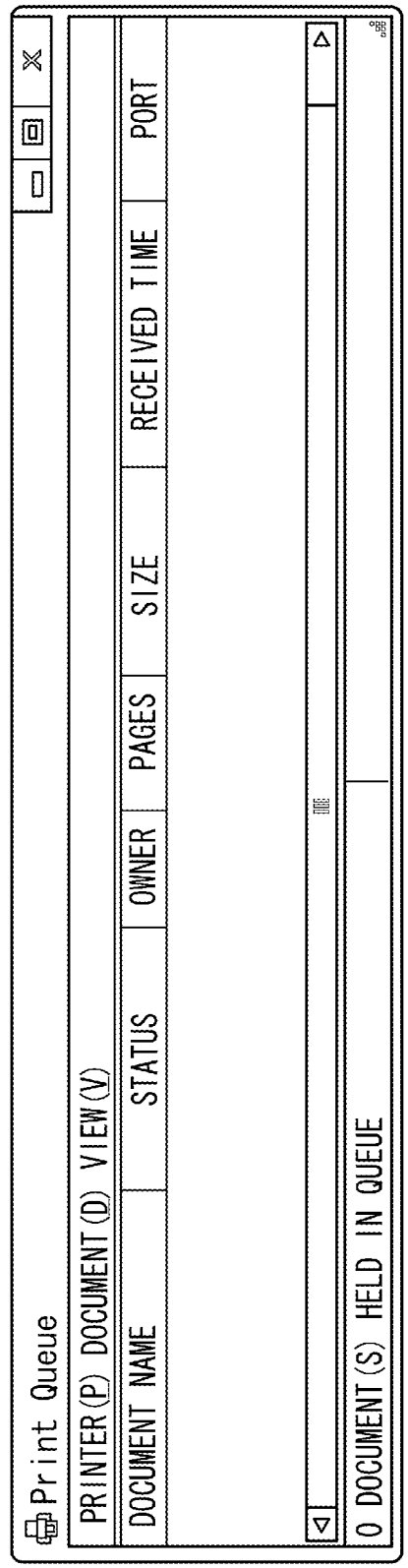

"Change" means changing the display of the management information from a state where a user issues a job print instruction and waits for printing by the printing apparatus 110 as illustrated in FIG. 18A to a state where printing of the job is completed as illustrated in FIG. 18B.

"Hidden" means literally that the management information of a job is hidden as illustrated in FIG. 18D. Moreover, "Hidden" includes a case where the print queue stores the history of the management information of jobs displayed in the past and can display the history after the job has been printed as illustrated in FIG. 18C.

"Delete" is included in "Hidden" described above but it means that the history of a job is not allowed to view, and the management information of the job itself is deleted so that the user cannot view the management information again.

The print queue can manage the management information of jobs by any of the methods "Change", "Hidden", and "Delete".

In the present specification, although an example in which the management information of a job is hidden from a print queue when print processing of the job displayed in the print queue is completed is described, the management (display) of the job may be performed by changing the management information.

<Processing Flow of Form Creation Job>

Figure 4:
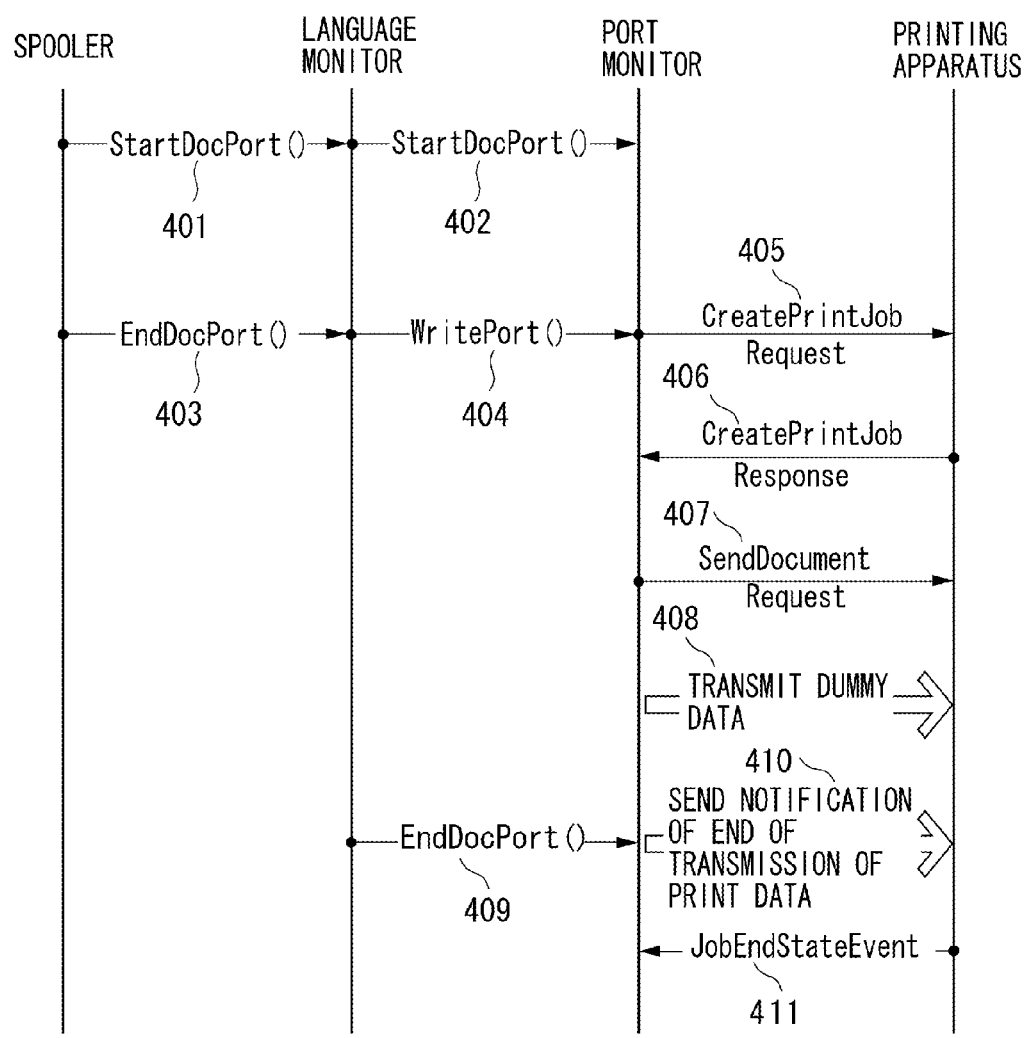
FIG. 4 illustrates an example flow of print processing of a form creation job.

The flow of processing of a form creation job in WSD printing according to the present exemplary embodiment will be described with reference to FIG. 4.

In step 401, the spooler 205 calls StartDocPort( ), which is a function of the language monitor 208, and starts print processing. In step 402, the language monitor 208 calls StartDocPort( ), which is a function of the port monitor 209.

The form creation job is a non-print job of which the print data is not transmitted to the printing apparatus 110. Therefore, the spooler 205 does not call WritePort( ) of the language monitor 208 unlike the processing in step 303 in FIG. 3, but in step 403, calls EndDocPort( ), which is a function of the language monitor 208.

Then, in step 404, the language monitor 208 calls WritePort( ) to the port monitor 209 and writes dummy data.

Figure 11:
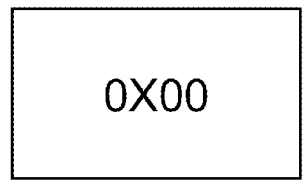
FIG. 11 illustrates example dummy data.

The dummy data is data which is deleted after being received and read by the printing apparatus 110. FIG. 11 illustrates an example of dummy data. In FIG. 11, the dummy data has a length of 1 byte and a value of 0.

The present invention can be applied to a specification in which the printing apparatus 110 reads and deletes dummy data when the dummy data is received. Reading and deleting the dummy data means that the printing apparatus 110 ends processing of a job without performing any print processing.

If dummy data corresponding to a non-print job is not written in step 404, the processing in steps 405 to 408 and 410 are not executed. Unless the processing in these steps are executed, since the printing apparatus 110 does not transmit JobEndStateEvent, which is end-of-processing information in step 411 to be described below, the management information of the form creation job remains in a non-completed state in the print queue 206.

In step 405, the port monitor 209 transmits CreatePrintJob Request to the printing apparatus 110 and a notification of start of print processing (in this case, writing of dummy data). In step 406, the printing apparatus 110 transmits CreatePrintJob Response to the port monitor 209. In step 407, the port monitor 209 transmits SendDocument Request to the printing apparatus 110. In step 408, the port monitor 209 transmits dummy data to the printing apparatus 110. After the dummy data is transmitted in step 408, the port monitor 209 returns WritePort( ) called in step 404 to the language monitor 208.

After the dummy data has been written, in step 409, the language monitor 208 calls EndDocPort( ), which is a function of the port monitor 209. In step 410, the port monitor 209 transmits end-of-transmission information indicating completion of transmission of dummy data in step 408 to the printing apparatus 110. When the dummy data has been processed, in step 411, the printing apparatus 110 transmits JobEndStateEvent, which is end-of-processing information, to the port monitor 209 and notifies it of completion of processing of the dummy data.

The flow in which the management information of a form creation job is hidden from the print queue 206 will be described.

In order for the printing apparatus 110 to process the dummy data, the information processing apparatus 100 transmits CreatePrintJob Request to the printing apparatus 110 and then receives, from the printing apparatus 110, JobEndStateEvent corresponding to the CreatePrintJob Response received from the printing apparatus 110. When the dummy data is properly processed by the printing apparatus, the JobEndStateEvent, which is the end-of-processing information, means changing the display of the management information of a form creation job in the print queue of the information processing apparatus to a completed state.

Thus, when the JobEndStateEvent described above is received from the printing apparatus 110, the management information of the form creation job is hidden from the print queue 206. That is, the display of the management information is changed to a completed state.

<Printing and Print Spooler Interfaces>

Next, processing for determining the job type of a job by the language monitor 208 will be described in detail.

Based on the job type determined herein, it is determined whether dummy data will be transmitted to the printing apparatus 110 in the processing of EndDocPort( ) of the language monitor 208 described below.

In this example, a method in which the graphics driver 204 notifies the language monitor 208 of the job type of a job using Printing and Print Spooler Interfaces described in the Microsoft Developer Network (MSDN) website will be described.

The graphics driver 204 can notify the language monitor 208 of whether the job type of a job is a normal print job or a form creation job using Printing and Print Spooler Interfaces.

Figure 5:
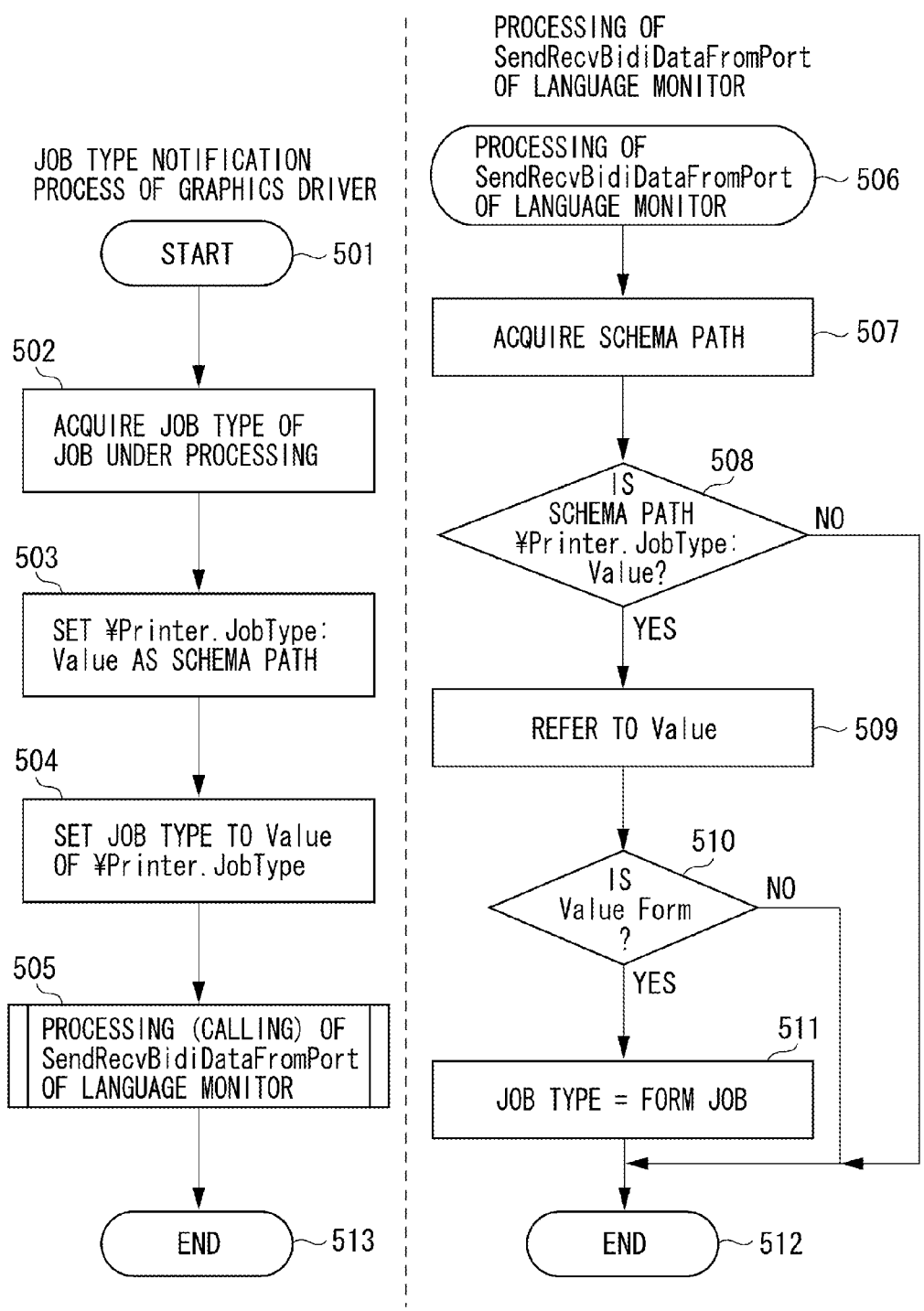
FIG. 5 is a flowchart illustrating example processing of a graphics driver for notifying a language monitor of the job type of a job.

In step 501 in FIG. 5, the graphics driver 204 starts job type notification processing. In step 502, the variable in which the setting of a print output method is stored in the RAM 101 is called, and the job type of the job under processing is acquired. In step 503, ¥Printer.JobType:Value is set as a schema path. In step 504, the job type acquired in step 502 is set as the Value. In step 505, processing of the language monitor 208 is called.

More specifically, the graphics driver 204 calls IBidiSpl::SendRecv( ), which is an application program interface (API) function of the Component Object Model (COM) interface IBidiSpl prepared in Printing and Print Spooler Interfaces. When the graphics driver 204 calls IBidiSpl::SendRecv( ), SendRecvBidiDataFromPort( ), which is an export function of the language monitor 208, is called.

In step 506, the language monitor 208 starts processing the SendRecvBidiDataFromPort( ). In step 507, the language monitor 208 acquires a schema path set to an argument of the function. In step 508, it is determined whether the schema path is ¥Printer.JobType:Value. If it is determined that the schema path is ¥Printer.JobType:Value (YES in step 508), the processing proceeds to step 509. In step 509, the language monitor 208 refers to the Value of the ¥Printer.JobType. If the schema path is not ¥Printer.JobType:Value (NO in step 508), the processing proceeds to step 512. In step 510, it is determined whether the Value is "Form". If the Value is "Form" (YES in step 510), then in step 511, "form creation job" is set to a variable representing the job type, and the variable is stored in the RAM 101. Then, the processing proceeds to step 512. If the Value is not "Form" (NO in step 510), the processing proceeds to step 512. In step 512, when the processing of SendRecvBidiDataFromPort( ) of the language monitor 208 ends, the calling of IBidiSpl::SendRecv( ) in step 505 is returned, and the processing proceeds to step 513. In step 513, the graphics driver 204 ends the job type notification processing.

Figure 7:
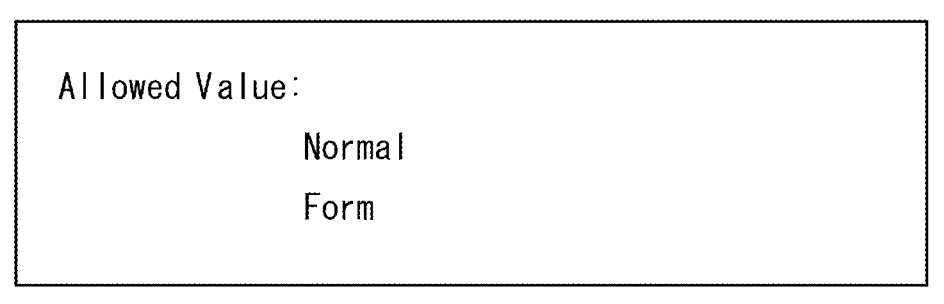

FIG. 6 illustrates an example of the schemas to be used when the graphics driver 204 notifies the language monitor 208 of the job type. These schemas are designated as arguments when the graphics driver 204 calls IBidiSpl::SendRecv( ). In FIG. 6, JobType is Value representing the type of a job, and the designation of the full schema path is ¥Printer.JobType:Value. The data type is BIDI_STRING. The values can be set, i.e., Allowed Value, are "Normal" and "Form" as illustrated in FIG. 7. "Normal" represents that the job is a normal print job. "Form" represents that the job is a form creation job.

<EndDocPort( ) Processing by Language Monitor>

Figure 9:
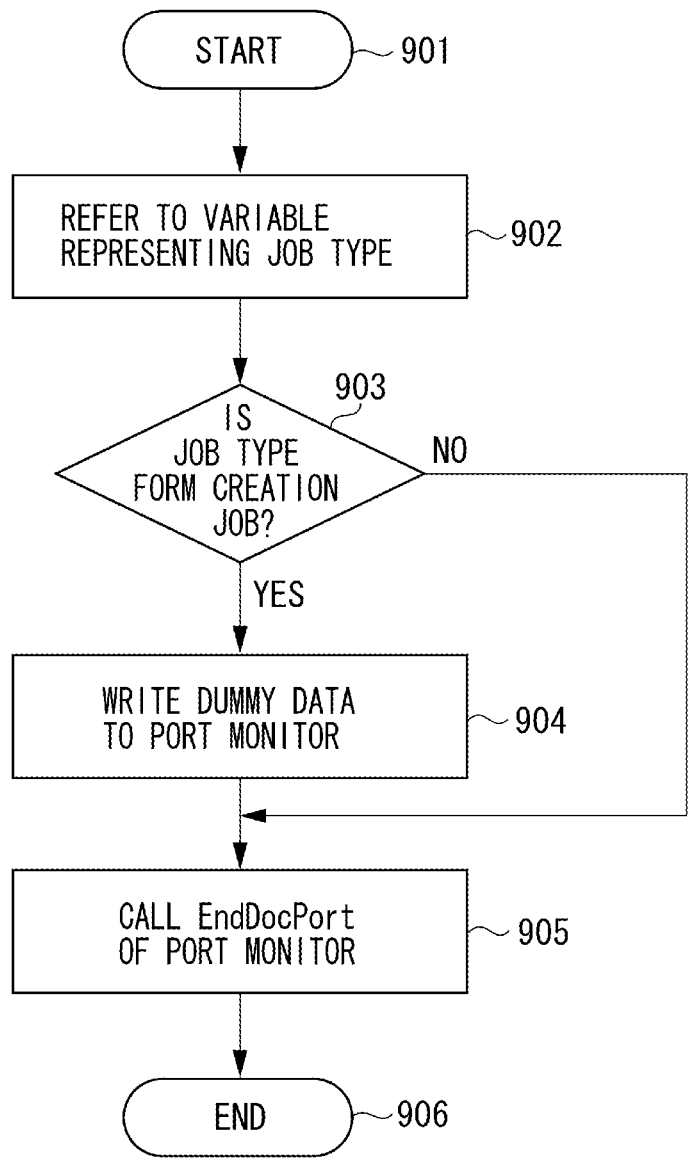
FIG. 9 is a flowchart illustrating example processing of EndDocPort( ) of the language monitor.

An operation in which the language monitor 208 switches the processing of EndDocPort ( ) based on a job type will be described with reference to FIG. 9.

In step 901, the language monitor 208 starts the processing of EndDocPort( ) called to the spooler 205, and in step 902, refers to a variable representing the job type in the RAM 101. In step 903, the language monitor 208 determines whether the job type is "form creation job". When the job type is "form creation job" (YES in step 903), the processing proceeds to step 904, and dummy data is written to the port monitor 209. Then, the processing proceeds to step 905. When the job type is not "form creation job" (NO in step 903), the processing proceeds to step 905. In step 905, the port monitor 209 calls EndDocPort( ), and then, the processing proceeds to step 906 where the processing ends.

In this way, the graphics driver 204 notifies the language monitor 208 of the fact that the job type of a job is a form creation job, and the language monitor 208 writes dummy data by the processing of EndDocPort( ). By doing so, JobEndStateEvent is transmitted from the printing apparatus 110 to the port monitor 209, and the print queue 206 can properly hide the management information of the form creation job.

In the present exemplary embodiment, an example in which the processing is switched based on whether the job type is a normal print job or a form creation job has be described. However, the present invention is not limited to this example, and the processing may be switched based on whether the job type of a job corresponding to a print instruction is a normal print job or a non-print job which is transmitted to the printing apparatus but is not printed.

In a second exemplary embodiment, an example in which the processing of EndDocPort( ) of the language monitor 208 is switched based on a determination criterion different from the job type used in the first exemplary embodiment will be described with reference to FIG. 8. The details of this example are described with reference to FIG. 10.

The configuration of the printing system according to the present exemplary embodiment is the same as that of the first exemplary embodiment, and the configuration illustrated in FIGS. 1 and 2 can be employed. Moreover, the flow of the processing of a form creation job in the WSD printing according to the present exemplary embodiment is the same as that illustrated in FIG. 4.

Figure 8:
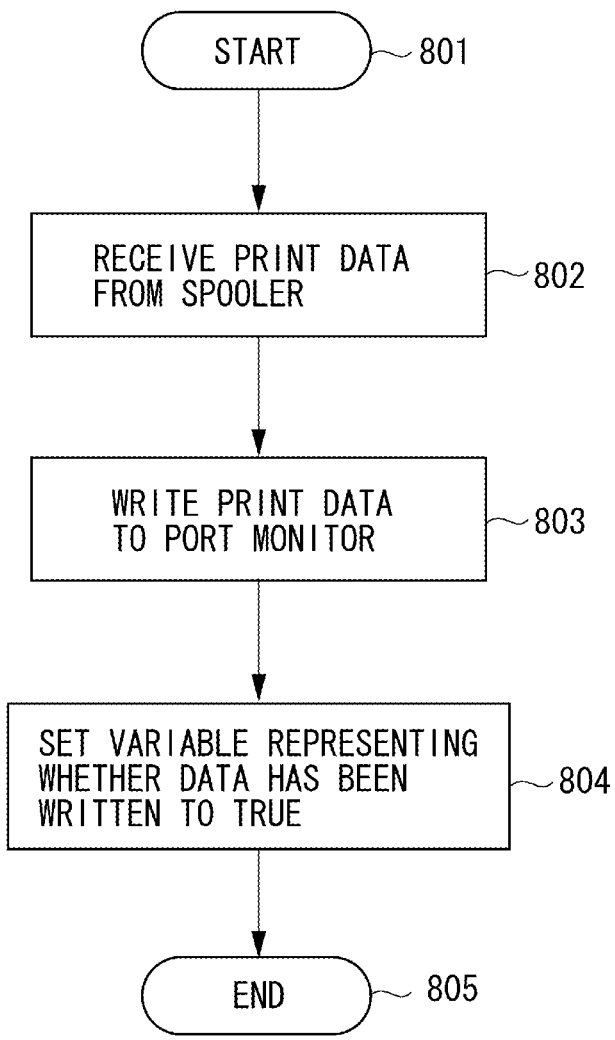
FIG. 8 is a flowchart illustrating example processing for storing whether a language monitor has written print data.

The processing illustrated in FIG. 8 is performed on only a normal print job. As illustrated in FIG. 4, as for a form creation job, the language monitor 208 is not called from the spooler 205, so that the processing of WritePort( ) is not executed.

Moreover, a variable representing whether data has been written is stored in the RAM 101, and "FALSE" is set to the variable as an initial value before the processing in FIG. 8 is executed.

The processing of WritePort( ) of the language monitor 208 on the normal print job will be described in detail with reference to FIG. 8.

In step 801, the language monitor 208 starts the processing of WritePort( ), and in step 802, receives print data from the spooler 205. In step 803, the print data is written to the port monitor 209. In step 804, "TRUE" is set to the variable representing whether data has been written. Then, the processing proceeds to step 805 and ends.

Figure 10:
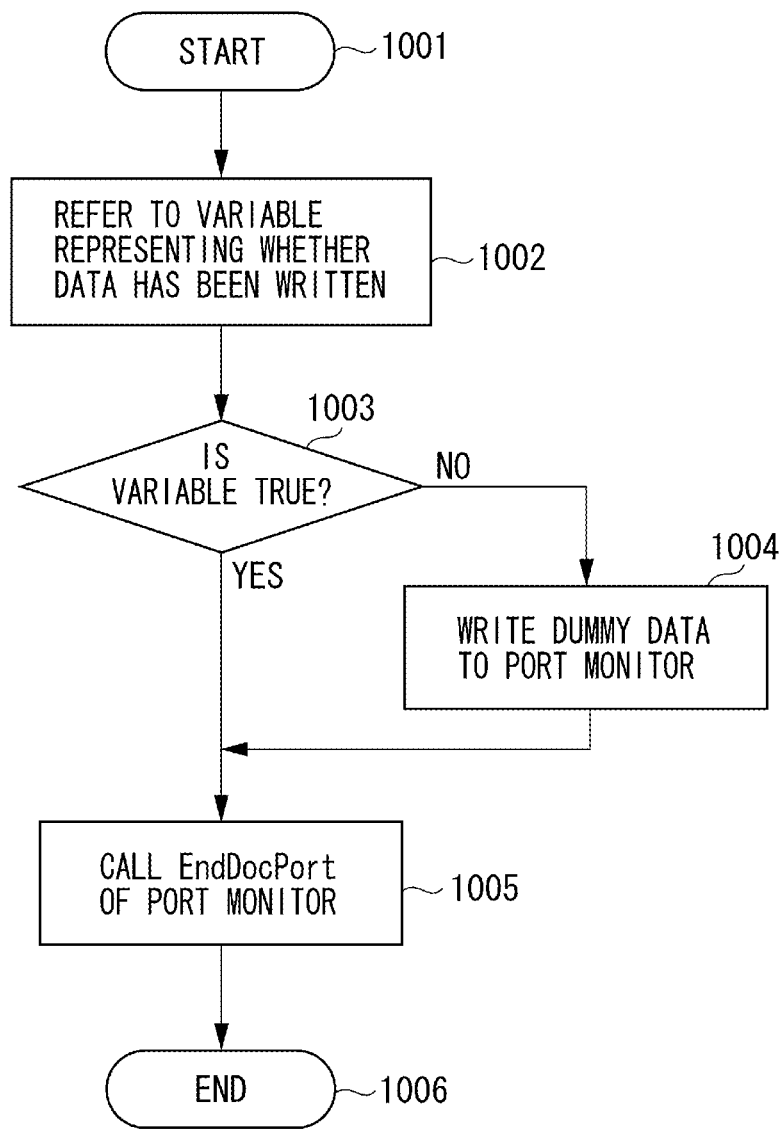
FIG. 10 is a flowchart illustrating the processing of EndDocPort( ) of the language monitor.

An operation in which the language monitor 208 switches the processing of EndDocPort( ) based on whether print data has been written during processing of a job will be described with reference to FIG. 10. In step 1001, the language monitor 208 starts the processing of EndDocPort( ). In step 1002, the language monitor 208 refers to the variable representing whether data has been written.

In step 1003, the language monitor 208 determines whether the value of the variable representing whether data has been written is "TRUE". If the value is "TRUE" (YES in step 1003), the processing proceeds to step 1005. When the value of the variable is not "TRUE" (NO in step 1003), that is, if the value is "FALSE", the processing proceeds to step 1004. In step 1004, the language monitor 208 writes dummy data to the port monitor 209 by the processing of WritePort( ). Then, the processing proceeds to step 1005. In step 1005, the language monitor 208 calls EndDocPort( ) of the port monitor 209. Then, the processing proceeds to step 1006 and ends.

In this way, in the case of a job like a form creation job, of which the data is not written to the printing apparatus 110, the language monitor 208 detects the job and writes the dummy data by the processing of EndDocPort( ). As a result, JobEndStateEvent is transmitted from the printing apparatus 110 to the port monitor 209, and the print queue 206 can properly hide the management information of the form creation job.

In the present exemplary embodiment, the issue can be solved without using the graphics driver 204 unlike the first exemplary embodiment in which the issue is solved by the graphics driver 204 and the language monitor 208.

In a third exemplary embodiment, the graphics driver 204 notifies the print support function 202 of the OS of the job type of a job. Then, in the print-end processing of the spooler 205, when the job type is a form creation job, the processing is terminated without waiting for end-of-processing information, whereby the issue is solved.

The configuration of the printing system according to the present exemplary embodiment is the same as that of the first exemplary embodiment, and the configuration illustrated in FIGS. 1 and 2 can be employed.

<Processing Flow of Form Creation Job>

Figure 12:
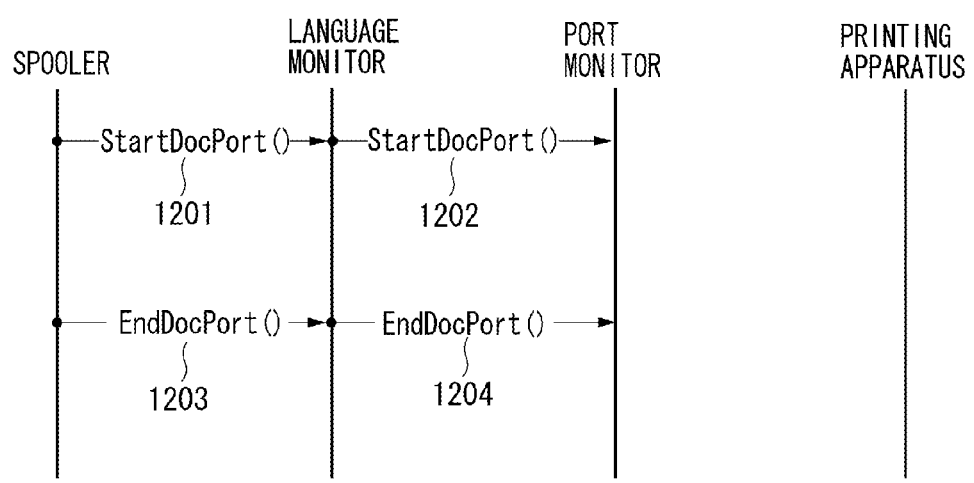
FIG. 12 illustrates an example flow of printing processing of a form creation job.

The flow of processing of a form creation job in WSD printing according to the present exemplary embodiment will be described with reference to FIG. 12.

In step 1201, the spooler 205 calls StartDocPort( ) which is a function of the language monitor 208, to start print processing. In step 1202, the language monitor 208 calls StartDocPort( ), which is a function of the port monitor 209.

Since the form creation job is a job of which the print data is not transmitted to the printing apparatus 110, the spooler 205 does not call WritePort( ) of the language monitor 208, but, in step 1203, calls EndDocPort( ), which is a function of the language monitor 208. In step 1204, the language monitor 208 calls EndDocPort( ), which is a function of the port monitor 209.

After the EndDocPort( ) called in step 1203 is returned, the spooler 205 executes a print-end processing and instructs the print queue 206 to hide the management information of the form creation job which has been printed.

<Notification of Job Type from Graphics Driver To Print Support Function of OS>

The flow in which the graphics driver 204 notifies the print support function 202 of the OS of the job type will be described with reference to FIG. 2.

The application 201 calls an application program interface (API) provided by the print support function 202 of the OS and creates data. The data created by the application 201 is transferred to the spooler 205 by the print support function 202 of the OS. The spooler 205 stores the received data in the spool data storage 207 for each job. When it is the time to perform processing of a job, the spooled data is transferred to the graphics driver 204 by the print support function 202 of the OS. In the present exemplary embodiment, in this case, the graphics driver 204 notifies the print support function 202 of the OS of the job type of the job.

The notification of the job type of a job is performed by the print support function 202 calling a predetermined export function of the graphics driver 204. When the print support function 202 of the OS calls the export function of the graphics driver 204, the graphics driver 204 sets the job type to the return value of the export function to terminate the processing of the export function. In this way, the graphics driver 204 notifies the print support function 202 of the OS of the job type.

Not only to this method, the job type may be notified to the print support function 202 of the OS by other methods. For example, when the application 201 calls an API to create a job, the job type may be notified to the print support function 202 of the OS via the API.

Then, the print support function 202 of the OS stores the notified job type in the RAM 101 as a variable which can be referenced by the spooler.

<Print-End Processing of Spooler>

Figure 13:
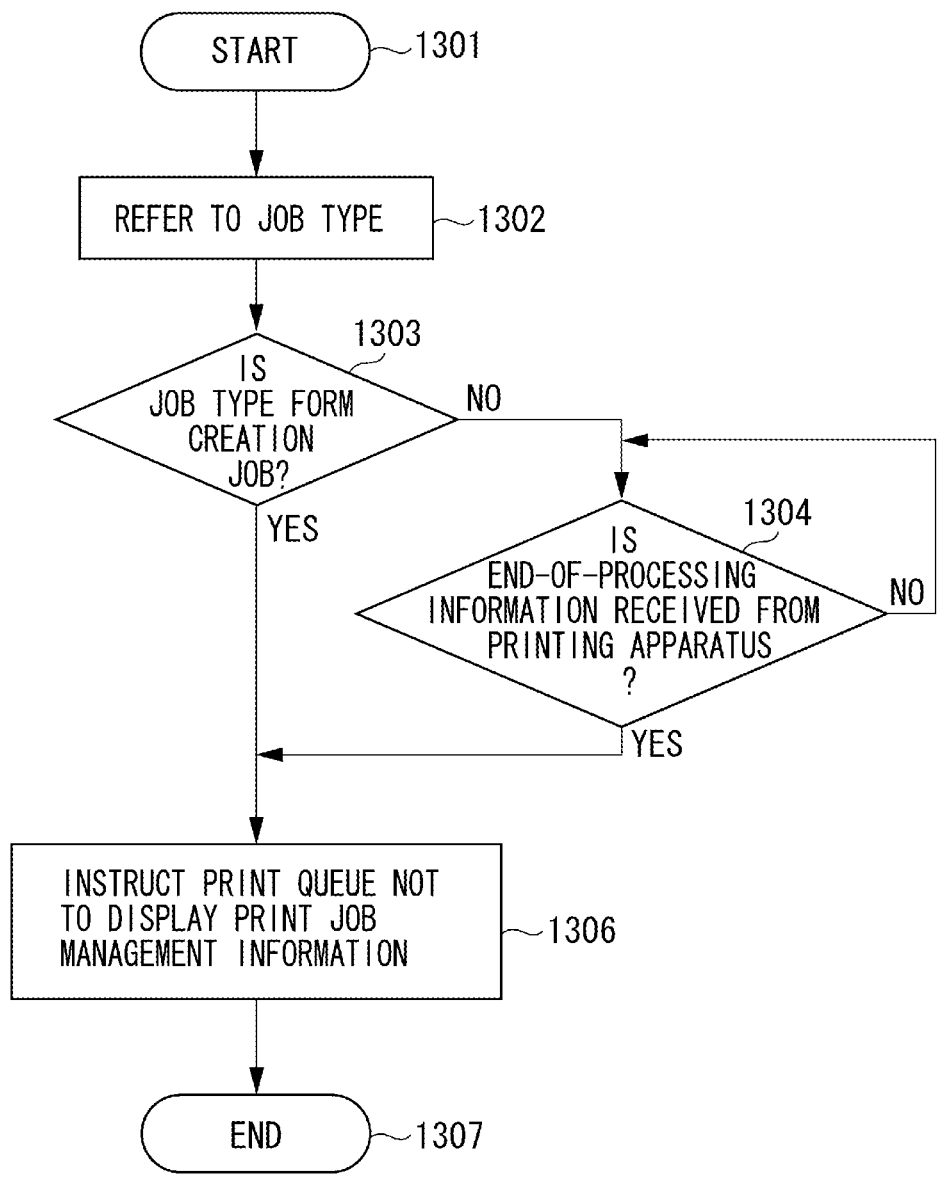
FIG. 13 is a flowchart illustrating example print-end processing of a spooler.

A case in which the print-end processing of the spooler 205 is switched based on the job type notified from the graphics driver 204 will be described with reference to FIG. 13.

In step 1301, the spooler 205 starts print-end processing. In step 1302, the spooler 205 refers to the job type which is notified from the graphics driver 204 and stored in the variable of the RAM 101. In step 1303, the spooler 205 determines whether the job type referenced in step 1302 is a form creation job. If the job type is a form creation job (YES in step 1303), the processing proceeds to step 1306. In step 1306, the spooler 205 instructs the print queue 206 to hide the management information of the form creation job of which the job type is notified. In step 1307, the spooler 205 ends the print-end processing.

When it is determined that the job type is not a form creation job (NO in step 1303), namely a normal print job, the processing proceeds to step 1304. In step 1304, the spooler 205 determines whether end-of-processing information is received from the printing apparatus 110. When it is determined that the end-of-processing information is not received (NO in step 1304), the spooler 205 waits to receive the end-of-processing information. Then, in step 1304, the spooler 205 again determines whether the end-of-processing information is received. When it is determined that the end-of-processing information is received (YES in step 1304), the processing proceeds to step 1306, and the spooler 205 instructs the print queue 206 to hide the management information of the normal print job of which the job type is notified. In step 1307, the spooler 205 ends the print-end processing.

In this way, in the print-end processing of the spooler 205, when the job type of a job is a form creation job, the spooler 205 instructs the print queue 206 to hide the management information of the form creation job without waiting to receive the end-of-processing information from the printing apparatus 110. As a result, it is possible to solve an issue in that the spooler waits for the end-of-processing information from the printing apparatus 110, so that the management information of the form creation job is not hidden from the print queue 206 but remains in the non-completed state.

According to the present exemplary embodiment, the management information of the form creation job in the print queue 206 can be hidden without performing communication with the printing apparatus 110 unlike the first and second exemplary embodiments. Thus, the issue can be solved even when the printing apparatus 110 is turned off and when the communication path between the information processing apparatus 100 and the printing apparatus 110 is disconnected. The same effect can be obtained in the following exemplary embodiments.

In a fourth exemplary embodiment, an example in which the print-end processing of the spooler 205 is switched based on a determination criterion different from the job type used in the third exemplary embodiment will be described with reference to FIGS. 16 and 17.

The configuration of the printing system according to the present exemplary embodiment is the same as that of the first exemplary embodiment, and the configuration illustrated in FIGS. 1 and 2 can be employed. The flow of the processing of a normal print job in the WSD printing is the same as that illustrated in FIG. 3. The flow of the processing of a form creation job is the same as that illustrated in FIG. 12.

Figure 16:
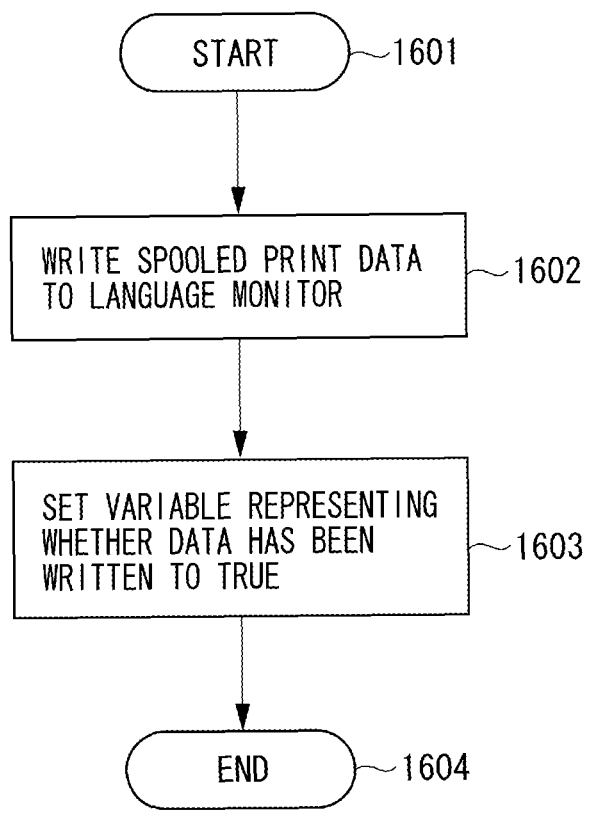
FIG. 16 is a flowchart illustrating example processing of the spooler for calling WritePort( ) of the language monitor.

The processing illustrated in FIG. 16 is performed on only a normal print job. As illustrated in FIG. 12, as for a form creation job, the language monitor 208 is not called from the spooler 205, so that the processing of WritePort( ) is not executed.

Moreover, a variable representing whether data has been written is stored in the RAM 101, and "FALSE" is set to the variable as an initial value before the processing in FIG. 16 is executed.

In FIG. 16, the spooler 205 determines whether print data has been written during the processing of a normal print job.

In step 1601, the spooler 205 starts the processing and, in step 1602, writes the spooled print data by the processing of WritePort( ) of the language monitor 208. In step 1603, "TRUE" is set to a variable representing whether data has been written. Then, the processing proceeds to step 1604 and ends.

A case in which the print-end processing of the spooler 205 is switched based on whether print data has been written during the processing of a job will be described with reference to FIG. 17. The print-end processing of the spooler 205 is performed after the EndDocPort( ) called in step 1203 in FIG. 12 is returned.

In step 1701, the spooler 205 starts the print-end processing. In step 1702, the spooler 205 refers to a variable representing whether data has been written. In step 1703, the spooler 205 determines whether the value of the variable referenced in step 1702 is "TRUE". When the value is not "TRUE" (NO in step 1703), the processing proceeds to step 1706. In step 1706, the spooler 205 instructs the print queue 206 to hide the management information of the job of which the print data is not written. Then, the processing ends in step 1707.

When the value is "TRUE" (YES in step 1703), the processing proceeds to step 1704, and the spooler 205 determines whether end-of-processing information is received from the printing apparatus 110. When it is determined that the end-of-processing information is not received (NO in step 1704), the spooler repeats the processing in step 1704. When it is determined that the end-of-processing information is received (YES in step 1704), the processing proceeds to step 1706. In step 1706, the spooler 205 instructs the print queue 206 to hide the management information of the job of which the print data is not written. Then, the processing ends in step 1707.

The processing in FIGS. 16 and 17 can be summarized as follows.

In the case of a normal print job, the processing in FIG. 16 is executed, and the variable representing whether data has been written has a value of "TRUE". Thus, in the processing of the spooler 205 in FIG. 17, the spooler waits until to receive the end-of-processing information from the printing apparatus 110.

In the case of a form creation job, since the processing in FIG. 16 is not executed, the variable representing whether data has been written remains with an initial value of "FALSE". Thus, the spooler 205 performs the processing in FIG. 17 to instruct the print queue 206 to hide the management information of the form creation job without waiting for the end-of-processing information from the printing apparatus 110.

In this way, when print data is not written during the processing of a job, the spooler 205 instructs the print queue 206 to hide the management information of a job of which the print data has not been written without waiting for the reception of the end-of-processing information from the printing apparatus 110. As a result, it is possible to solve an issue in that the spooler waits for the end-of-processing information from the printing apparatus 110, so that the management information of a job of which the print data has not been written is not hidden from the print queue 206.

In a fifth exemplary embodiment, the port monitor 209 determines whether the WritePort( ) of the port monitor 209 itself is written and causes the spooler 205 to instruct the print queue 206 to hide the management information of a job, whereby the issue is solved.

The configuration of the printing system according to the present exemplary embodiment is the same as that of the first exemplary embodiment, and the configuration illustrated in FIGS. 1 and 2 can be employed. The flow of the processing of a normal print job in the WSD printing is the same as that illustrated in FIG. 3. The flow of the processing of a form creation job is the same as that illustrated in FIG. 12.

Figure 14:
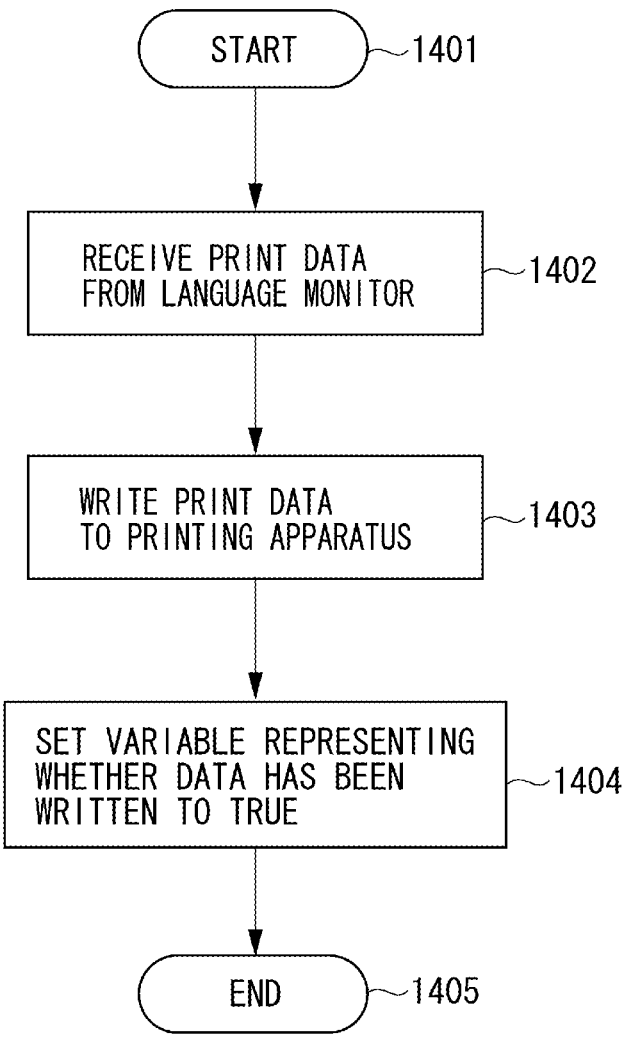
FIG. 14 is a flowchart illustrating example processing for storing whether a port monitor has written print data.

Moreover, a variable representing whether data has been written is stored in the RAM 101, and "FALSE" is set to the variable as an initial value before the processing in FIG. 14 is executed.

The processing of WritePort( ) of the port monitor 209 on the normal print job will be described in detail with reference to FIG. 14.

In step 1401, the port monitor 209 starts the processing of WritePort( ), and in step 1402, receives print data from the language monitor 208. In step 1403, the port monitor 209 writes the print data received in step 1402 to the printing apparatus 110. In step 1404, "TRUE" is set to the variable representing whether data has been written. Then, the processing proceeds to step 1405 and ends.

Figure 15:
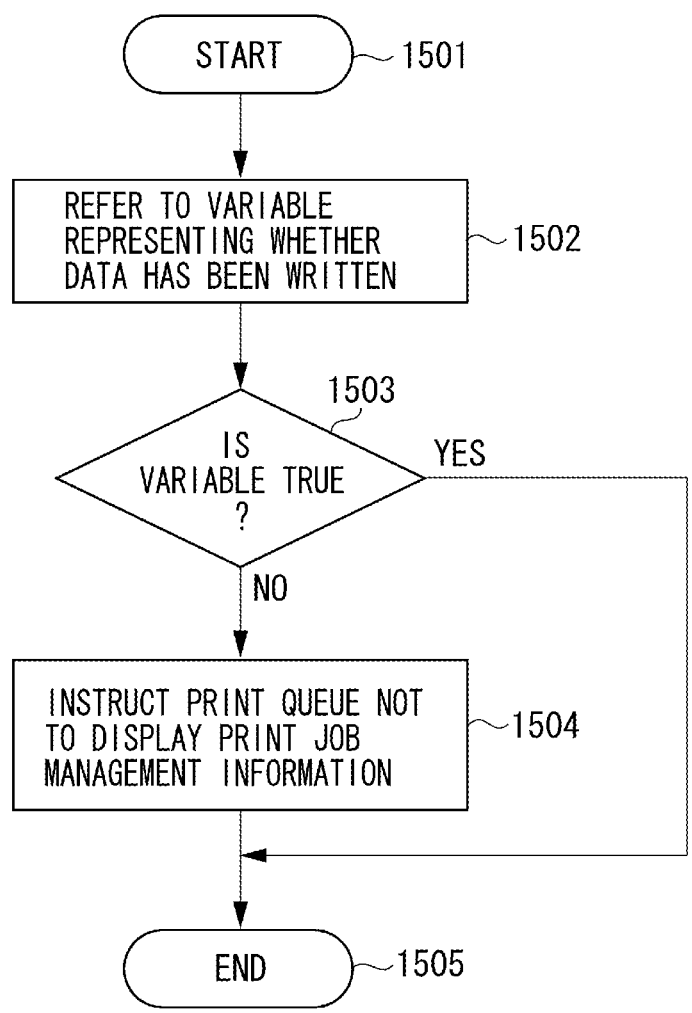
FIG. 15 is a flowchart illustrating example processing of EndDocPort( ) of the port monitor.

An operation in which the port monitor 209 switches the processing of EndDocPort( ) based on whether print data has been written during processing of a job will be described with reference to FIG. 15.

In step 1501, the port monitor 209 starts the processing of EndDocPort( ). In step 1502, the port monitor 209 refers to the variable representing whether data has been written. In step 1503, the port monitor 209 determines whether the value of the variable referenced in step 1502 is "TRUE". If the value is not "TRUE" (NO in step 1503), the processing proceeds to step 1504. In step 1504, the port monitor 209 causes the spooler 205 to instruct the print queue 206 to hide the management information of the job of which the print data is not written. Then, the processing proceeds to step 1505 and ends. When the value is "TRUE" (YES in step 1503), the processing proceeds to step 1505 and ends.

The processing in FIGS. 14 and 15 can be summarized as follows.

In the case of a normal print job, the processing in FIG. 14 is executed, and the variable representing whether data has been written has a value of "TRUE". Thus, nothing is performed in the processing of the port monitor 209 in FIG. 15.

In the case of a form creation job, since the processing in FIG. 14 is not executed, the variable representing whether data has been written remains with an initial value of "FALSE". Thus, the port monitor 209 performs the processing in FIG. 15 to instruct the print queue 206 to hide the management information of the form creation job.

In this way, in the case of a non-print job, the port monitor 209 detects the non-print job and instructs the spooler 205 to hide the management information of the job in the print queue 206 by the processing of EndDocPort( ). As a result, even when JobEndStateEvent is not transmitted from the printing apparatus 110 to the port monitor 209, and the print-end information is not notified, it is possible to properly hide the management information of the form creation job in the print queue 206.

In the third exemplary embodiment, in the print-end processing of the spooler 205, the print support function 202 of the OS performs the processing by referring to the job type stored in the variable. The present invention is not limited to this, and in a sixth exemplary embodiment, the print support function 202 of the OS may directly instruct the print queue 206 to hide the management information.

In this case, when the print support function 202 of the OS stores the job type in the variable, the print support function 202 directly notifies the print queue 206 of the job type, so that the print queue 206 determines that the job type is a non-print job and hides the management information of the non-print job.

In the first exemplary embodiment, an example in which the end-of-transmission information is transmitted from the information processing apparatus 100 to the printing apparatus 110 by the WSD printing, whereby the completion of transmission is notified to the printing apparatus 110 is described.

However, the present invention is not limited to the above example, in a seventh exemplary embodiment, the printing apparatus 110 may recognize the end of transmission of a job by a method for notifying the printing apparatus 110 of the size of a job, which is transmitted by the information processing apparatus 100 at the beginning of the transmission. In this case, after transmission of a job is completed, the size of the job received from the information processing apparatus 100 is compared with the size of the job which the information processing apparatus 100 has notified to the printing apparatus 110. When the two job sizes are identical to each other, it is determined that transmission of the job is completed.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2011-111584 filed May 18, 2011, which is hereby incorporated by reference herein in its entirety.

What is claimed is:

1. An information processing apparatus in which management information for managing a job is displayed in a print queue of the information processing apparatus, and end-of-processing information that changes the display of the management information of the job in the print queue from a non-completed state to a completed state is received from a printing apparatus after the job is transmitted through a communication path to the printing apparatus, the information processing apparatus comprising:

a determination unit configured to determine whether a job corresponding to the management information in the print queue is a non-print job of which print data of the job to be printed by the printing apparatus is not transmitted to the printing apparatus; and a transmission unit configured, if the determination unit determines that the job is the non-print job, to transmit dummy data which corresponds to the non-print job and which is not printed by the printing apparatus to the printing apparatus, wherein a language monitor executes the determination unit, and wherein the transmission unit receives end-of-processing information of the dummy data after transmitting the dummy data to the printing apparatus, so that the management information of the non-print job in the print queue is changed from a non-completed state to a completed state.

2. The information processing apparatus according to claim 1, further comprising a notification unit configured to notify that the job is a non-print job, wherein the determination unit determines that the job is a non-print job based on the notification of the notification unit.

3. The information processing apparatus according to claim 1, further comprising an instruction unit configured to issue an instruction to transmit the print data of the job to be printed by the printing apparatus to the printing apparatus, wherein the determination unit determines that the job is a non-print job if the instruction unit does not issue an instruction to transmit the print data to the printing apparatus.

4. The information processing apparatus according to claim 1, wherein the completed state is either a state where display of the management information of the job is hidden or a state where the management information of the job is displayed by comprising information indicating completion of processing of the job by the printing apparatus in the management information of the job.

5. A method for performing control in which management information for managing a job is displayed in a print queue of an information processing apparatus, and end-of-processing information that changes the display of the management information of the job in the print queue from a non-completed state to a completed state is received from a printing apparatus after the job is transmitted through a communication path to the printing apparatus, the method comprising:

determining whether a job corresponding to the management information in the print queue is a non-print job of which print data of the job to be printed by the printing apparatus is not transmitted to the printing apparatus; and transmitting dummy data which corresponds to the non-print job and which is not printed by the printing apparatus to the printing apparatus if the job is determined as the non-print job, wherein a language monitor executes the determination, and wherein end-of-processing information of the dummy data is received after the dummy data is transmitted to the printing apparatus, so that the management information of the non-print job in the print queue is changed from a non-completed state to a completed state.

6. The method according to claim 5, further comprising notifying that the job is a non-print job, wherein the job is determined as a non-print job based on the notification.

7. The method according to claim 5, further comprising issuing an instruction to transmit print data of the job to be printed by the printing apparatus to the printing apparatus, wherein the job is determined as a non-print job if the instruction to transmit the print data to the printing apparatus is not issued.

8. The method according to claim 5, wherein the completed state is either a state where display of the management information of the job is hidden or a state where the management information of the job is displayed by comprising information indicating completion of processing of the job by the printing apparatus in the management information of the job.

9. A non-transitory computer readable recording medium that stores a program for causing a computer to function as:
an information processing apparatus in which management information for managing a job is displayed in a print queue of the information processing apparatus, and end-of-processing information that changes the display of the management information of the job in the print queue from a non-completed state to a completed state is received from a printing apparatus after the job is transmitted through a communication path to the printing apparatus, the information processing apparatus comprising:
a determination unit configured to determine whether a job corresponding to the management information in the print queue is a non-print job of which print data of the job to be printed by the printing apparatus is not transmitted to the printing apparatus; and
a transmission unit configured, if the determination unit determines that the job is the non-print job, to transmit dummy data which corresponds to the non-print job and which is not printed by the printing apparatus to the printing apparatus,
wherein a language monitor executes the determination unit, and
wherein the transmission unit receives end-of-processing information of the dummy data after transmitting the dummy data to the printing apparatus, so that the management information of the non-print job in the print queue is changed from a non-completed state to a completed state.

10. The medium according to claim 9, further comprising an instruction unit for issuing an instruction to transmit print data of the job to be printed by the printing apparatus to the printing apparatus,
wherein the job is determined as a non-print job if the instruction to transmit the print data to the printing apparatus is not issued.

11. The method according to claim 9, wherein the completed state is either a state where display of the management information of the job is hidden or a state where the management information of the job is displayed by comprising information indicating completion of processing of the job by the printing apparatus in the management information of the job.

12. The method according to claim 9, wherein the completed state is either a state where display of the management information of the job is hidden or a state where the management information of the job is displayed by comprising information indicating completion of processing of the job by the printing apparatus in the management information of the job.

* * * * *